(12) United States Patent
Ikeda et al.

(10) Patent No.: US 10,486,744 B2
(45) Date of Patent: Nov. 26, 2019

(54) VEHICLE FRAME MEMBER

(71) Applicant: TOYOTA JIDOSHA KABUSHIKI KAISHA, Toyota-shi, Aichi-ken (JP)

(72) Inventors: Koki Ikeda, Toyota (JP); Shunsuke Kanagai, Anjo (JP); Yasunori Sawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 48 days.

(21) Appl. No.: 15/914,254

(22) Filed: Mar. 7, 2018

(65) Prior Publication Data

US 2018/0273096 A1    Sep. 27, 2018

(30) Foreign Application Priority Data

Mar. 22, 2017 (JP) .................... 2017-056535

(51) Int. Cl.
   *B62D 21/15*   (2006.01)
   *B62D 27/02*   (2006.01)

(52) U.S. Cl.
   CPC ........... *B62D 21/15* (2013.01); *B62D 27/023* (2013.01)

(58) Field of Classification Search
   CPC ........ B62D 21/15; B62D 21/00; B62D 25/00; B62D 27/023; B21C 37/0803
   See application file for complete search history.

(56) References Cited

U.S. PATENT DOCUMENTS

| | | | | |
|---|---|---|---|---|
| 2004/0021342 A1* | 2/2004 | Fujimoto | ............... | B60R 21/34 296/193.11 |
| 2012/0098299 A1* | 4/2012 | Kawamura | ............ | B62D 25/00 296/203.01 |
| 2014/0354009 A1* | 12/2014 | Honda | ................... | B62D 25/04 296/187.12 |
| 2015/0151792 A1* | 6/2015 | Mori | ..................... | B62D 21/152 296/187.09 |
| 2015/0175208 A1* | 6/2015 | Kuwayama | .......... | B62D 21/152 296/187.09 |
| 2015/0360725 A1* | 12/2015 | Yoshida | ............... | B62D 21/157 296/203.01 |
| 2016/0023684 A1* | 1/2016 | Lange | ................... | B62D 27/02 296/203.01 |
| 2016/0221610 A1* | 8/2016 | Nishimura | ........... | B62D 25/087 |
| 2017/0066306 A1* | 3/2017 | Ueno | ....................... | B60J 5/101 |
| 2017/0129314 A1* | 5/2017 | Sawa | ....................... | B60R 21/02 |
| 2017/0210425 A1* | 7/2017 | Sekiguchi | .............. | B62D 25/08 |

FOREIGN PATENT DOCUMENTS

| | | |
|---|---|---|
| JP | 2013-087879 A | 5/2013 |
| JP | 2015-089721 A | 5/2015 |
| JP | 2016-107892 A | 6/2016 |

* cited by examiner

*Primary Examiner* — Lori L Lyjak
(74) *Attorney, Agent, or Firm* — Oliff PLC

(57) ABSTRACT

A vehicle frame member includes: an outer panel configured to be disposed at a vehicle outer side, and having a U-shaped cross-section open toward a vehicle inner side; an inner panel configured to be disposed at the vehicle inner side, having a U-shaped cross-section open toward the vehicle outer side, and configuring a closed cross section structure together with the outer panel by both opening-ends of the inner panel respectively abutting and being joined to both opening-ends of the outer panel; and a bead formed at one or both abutting-joint portions between the outer panel and the inner panel, and projecting toward an outside of the closed cross section structure.

8 Claims, 7 Drawing Sheets

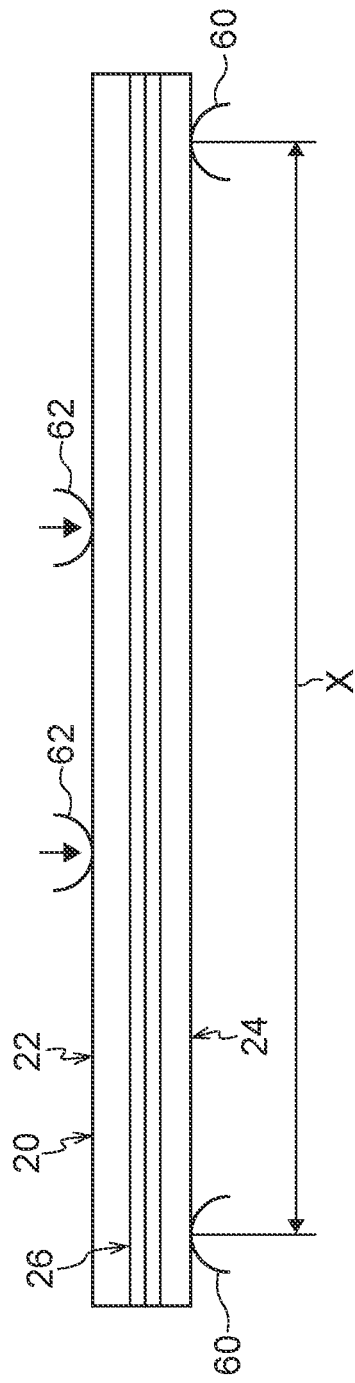

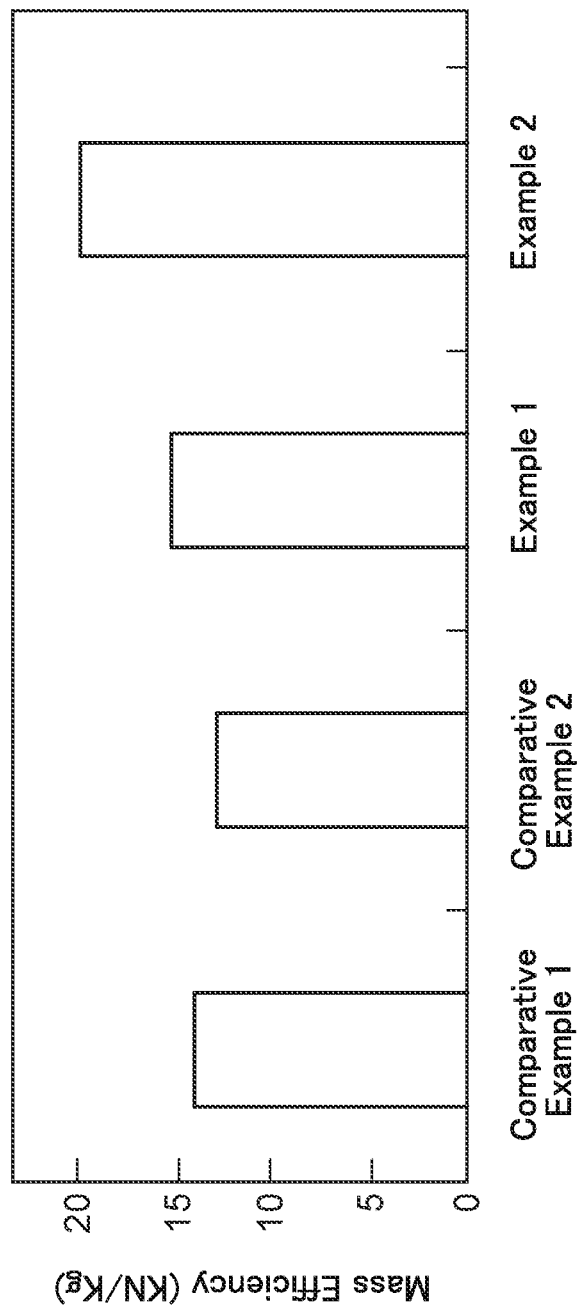

VEHICLE FRAME MEMBER

CROSS-REFERENCE TO RELATED APPLICATION

This application claims priority under 35 USC 119 from Japanese Patent Application No. 2017-056535 filed Mar. 22, 2017, the disclosure of which is incorporated by reference herein in its entirety.

BACKGROUND

Technical Field

Preferred embodiments relate to a vehicle frame member.

Related Art

As a vehicle frame member having a closed cross-section structure, a vehicle frame member is known in which flanges of two panels, each configured with a hat-shaped cross-section, are spot welded together (for example, Japanese Patent Application Laid-Open (JP-A) No. 2015-089721).

In the vehicle frame member in which the flanges of the two panels, each configured with a hat-shaped cross-section, are spot welded together, the flanges improve bending rigidity, and suppress out-of-plane deformation of side faces in the event of a collision.

However, an extra area is necessary in the vicinity of a position for the spot welds in order to spot weld the flanges of the two panels together. Thus, it becomes necessary for the flanges to be a predetermined size, decreasing the mass efficiency of the vehicle frame member (maximum bending load/mass).

SUMMARY

In consideration of the above circumstances, an object of preferred embodiments is to provide a vehicle frame member that improves mass efficiency while securing bending rigidity.

A vehicle frame member of a first aspect of the disclosure includes an outer panel, an inner panel, and a bead. The outer panel is configured to be disposed at an outer side of a vehicle, and has a U-shaped cross-section open toward a vehicle inner side. The inner panel is configured to be disposed at the vehicle inner side, has a U-shaped cross-section open toward the vehicle outer side, and configures a closed cross-section structure together with the outer panel by both opening-ends of the inner panel respectively abutting and being joined to both opening-ends of the outer panel. The bead is formed at one or both abutting-joint portions between the outer panel and the inner panel, and projects toward an outside of the closed cross-section structure. Namely, the bead is formed between the outer panel and the inner panel, at one or both joint portions at which the outer panel and the inner panel abut each other, and the bead projects toward an outer side of the closed cross section structure.

In the vehicle frame member of the first aspect, both opening-ends of the inner panel respectively abut and are joined to both opening-ends of the outer panel. Thus, in contrast to a structure in which, for example, a flange formed at an outer panel and a flange formed at an inner panel are joined by spot welding, there is no portion in the vehicle frame member that is used for joining and that does not contribute to improving maximum bending load, thereby improving mass efficiency of the vehicle frame member.

Further, in the vehicle frame member of the first aspect, the bead is formed at one or both of the abutting-joint portions between the outer panel and the inner panel. Thus, compared to a structure, for example, in which beads are not formed at abutting-joint portions between an outer panel and an inner panel, the section modulus is higher, enabling bending rigidity of the vehicle frame member to be secured.

A vehicle frame member of a second aspect of the present disclosure is the vehicle frame member of the first aspect, wherein at least one of the opening-ends of the outer panel and at least one of the opening-ends of the inner panel are respectively positioned at an apex of the bead.

In the vehicle frame member of the second aspect, at least one of the opening-ends of the outer panel and at least one of the opening-ends of the inner panel are respectively positioned at the apex. Namely, one part of the bead, that is divided with a boundary at the apex, is formed at an opening-end side of the outer panel. The other part of the divided bead is formed at an opening-end side of the inner panel. Thus, in the vehicle frame member, the outer panel and the inner panel can be formed more easily by press-forming compared with, for example, a structure in which the bead is divided at a wall or a base of the bead.

A vehicle frame member of a third aspect of the present disclosure is the vehicle frame member of the first aspect or the second aspect, wherein the apex of the bead is positioned at a central position at the closed cross-section structure in a vehicle interior-exterior direction or further to a vehicle outer side than the central position.

In the vehicle frame member of the third aspect, the apex of the bead is positioned at a central position at the closed cross-section structure formed by the outer panel and the inner panel in a vehicle interior-exterior direction, or further to the vehicle outer side than the central position. This improves bending rigidity (maximum bending load) with respect to input (for example, collision load) from the vehicle outer side to the inner side compared to a structure, for example, in which the apex of the bead is positioned at a vehicle inner side of the central position. Namely, in the vehicle frame member, the rigidity at the central position or at a portion positioned further to the vehicle outer side than the central position in the vehicle interior-exterior direction is improved by the bead. This enables out-of-plane deformation of the vehicle frame member with respect to input from the vehicle outer side toward the inner side to be reduced. Note that "maximum bending load" here refers to the maximum bending load (bending load limit) which causes the vehicle frame member to undergo plastic deformation.

A vehicle frame member of a fourth aspect of the present disclosure is the vehicle frame member of any one of the first aspect to the third aspect, wherein the bead is formed by a bead-half that is one piece of the outer panel and by a bead-half that is one piece of the inner panel.

In the vehicle frame member of the fourth aspect, the bead is formed by the bead-half that is one piece of the outer panel and by the bead-half that is one piece of the inner panel. This enables the outer panel and the inner panel to be easily press-formed.

The present disclosure enables provision of a vehicle frame member that improves mass efficiency while securing bending rigidity.

BRIEF DESCRIPTION OF THE DRAWINGS

Preferred embodiments will be described in detail based on the following figures, wherein:

FIG. 5 is a side view outlining a four point static bending test;

FIG. 6 is a graph of the mass efficiencies of respective vehicle frame members used in a test;

DETAILED DESCRIPTION

First Exemplary Embodiment

Explanation follows regarding a vehicle frame member according to a first exemplary embodiment of the present disclosure.

Vehicle Frame Member

Figure 1:
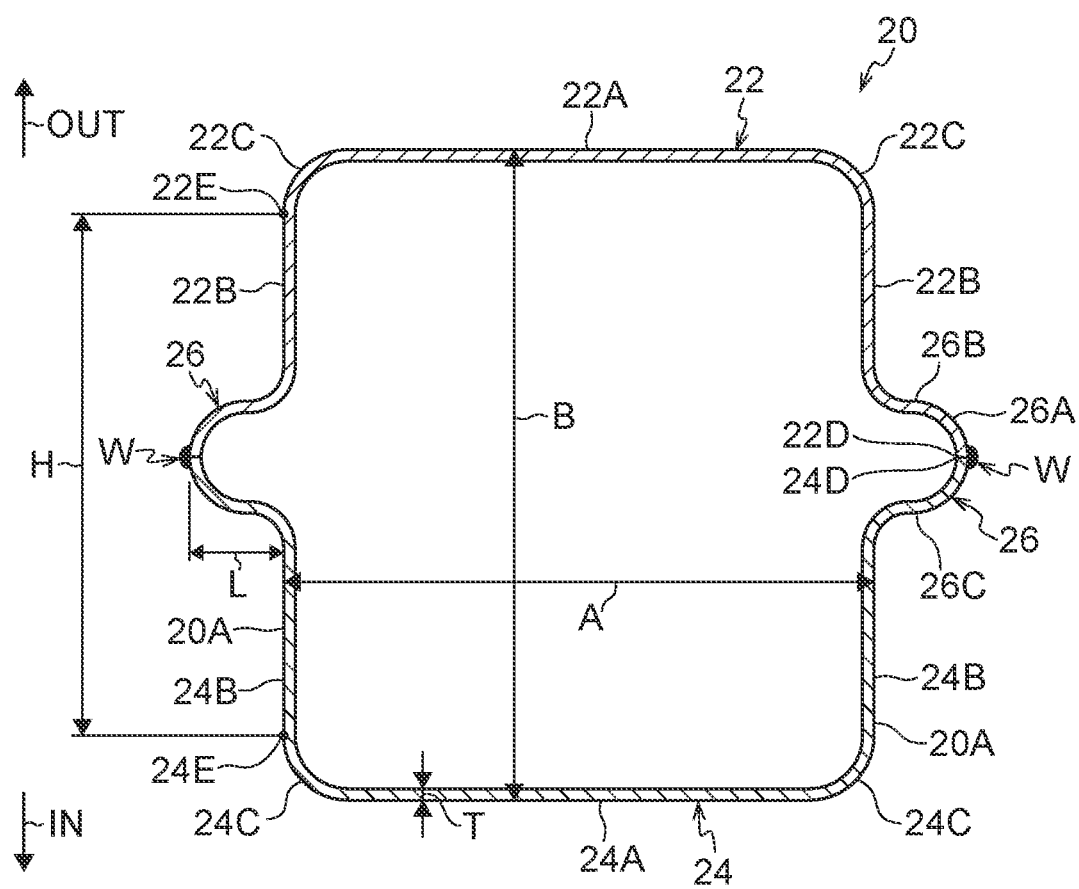
FIG. 1 is a cross-section of a vehicle frame member according to a first exemplary embodiment of the present disclosure.

As illustrated in FIG. 1, a vehicle frame member 20 of the present exemplary embodiment is an elongated member made of metal, and is a member that configures a frame of a vehicle. The vehicle frame member 20 may be employed, for example, in a center pillar (B pillar), a dashboard cross member, front bumper reinforcement, a rear cross member, or rear bumper reinforcement. Note that the vehicle frame member 20 may be employed as a member other than the aforementioned vehicle frame configuration members.

The vehicle frame member 20 includes an outer panel 22, an inner panel 24, and beads 26. In FIG. 1, the arrow OUT indicates a vehicle outer side (collision load input side) and the arrow IN indicates a vehicle inner side, from the perspective of the vehicle frame member 20 when provided at a vehicle. Note that in cases in which the vehicle frame member 20 serves, for example, as a center pillar, the vehicle outer side of the center pillar would be the vehicle width direction outer side. Further, in cases in which the vehicle frame member 20 serves, for example, as front bumper reinforcement, the vehicle outer side of the front bumper reinforcement would be the vehicle front side.

Outer Panel

The outer panel 22 is positioned at a vehicle outer side of the vehicle frame member 20, and has a U-shaped cross-section open toward the vehicle inner side. Specifically, the outer panel 22 includes a flat plate portion 22A, and side-plate portions 22B extending toward the vehicle inner side from two ends of the flat plate portion 22A. The outer panel 22 is pressed from sheet metal (high tensile sheet steel in the present exemplary embodiment), and curved portions 22C are formed at the boundaries between the flat plate portion 22A and the respective side plate portions 22B.

Inner Panel

The inner panel 24 is positioned at the vehicle inner side of the vehicle frame member 20, and has a U-shaped cross-section open toward the vehicle outer side. Specifically, the inner panel 24 includes a flat plate portion 24A, and side-plate portions 24B extending toward the vehicle outer side from two ends of the flat plate portion 24A. The inner panel 24 is pressed from sheet metal (high tensile sheet steel in the present exemplary embodiment) and curved portions 24C are formed at the boundaries between the flat plate portion 24A and the respective side-plate portions 24B.

Further, both opening-ends 22D of the outer panel 22 and both opening-ends 24D of the inner panel 24 respectively abut together and are joined by laser welding in the present exemplary embodiment. This abutting-joint configures a closed cross-section structure formed by the outer panel 22 and the inner panel 24. Namely, the vehicle frame member 20 is configured by the closed cross-section structure.

Note that the opening-ends 22D of the outer panel 22 refer to the ends of the side-plate portions 22B (ends on the vehicle inner side), and the opening-ends 24D of the inner panel 24 refer to the ends of the side-plate portions 24B (ends on the vehicle outer side).

Beads

The beads 26 are formed at two abutting-joint portions W between the outer panel 22 and the inner panel 24. Each bead 26 projects toward outside of the closed cross-section structure. Further, the opening-ends 22D of the outer panel 22 and the opening-ends 24D of the inner panel 24 are positioned at respective apexes 26A of the beads 26. Namely, the opening-ends 22D of the outer panel 22 and the opening-ends 24D of the inner panel 24 abut together and are joined at the apexes 26A of the beads 26.

Note that one part of each bead 26 divided with a boundary at the apex 26A of the bead 26 (referred to below as a "bead-half 26B" as appropriate) is formed on the opening-end 22D side of the outer panel 22. The bead-halves 26B are formed at the respective ends of the two side-plate portions 22B when pressing from sheet metal as described above. Similarly, the other part of each bead 26 divided with a boundary at the apex 26A of the bead 26 (referred to below as a "bead-half 26C" as appropriate) is formed on the opening-end 24D side of the inner panel 24. The bead-halves 26C are formed at the respective ends of the two side-plate portions 24B when pressing from sheet metal as described above.

The apexes 26A of the beads 26 are curved in circular arc shapes at the closed cross-section structure. Specifically, each bead 26 has a shape forming a continuous curve from a base thereof to the apex 26A. Further, the apex 26A of each bead 26 is positioned at the vehicle interior-exterior direction central position of the closed cross-section structure.

Explanation follows regarding operation and advantageous effects of the vehicle frame member 20 of the present exemplary embodiment.

In the vehicle frame member 20, both opening-ends 24D of the inner panel 24 and both opening-ends 22D of the outer panel 22 respectively abut together and are joined. Thus, in contrast to a structure in which, for example, a flange formed at an outer panel and a flange formed at an inner panel are joined by spot welding, there is no portion that is used for joining and that does not contribute to improving maximum bending load, thereby improving mass efficiency (maximum bending load/mass) of the vehicle frame member 20.

Further, in the vehicle frame member 20, the beads 26 are formed at both of the abutting-joint portions W between the outer panel 22 and the inner panel 24. Thus, compared to a structure, for example, in which the beads 26 are not formed at the abutting-joint portions W between an outer panel and an inner panel, the section modulus is higher, enabling bending rigidity of the vehicle frame member 20 to be secured. Thus, the vehicle frame member 20 is capable of reducing or preventing bending deformation of the vehicle frame member 20 with respect to input (collision load) from the vehicle outer side toward the inner side, and, in particular, out-of-plane bending deformation of side-faces 20A of the vehicle frame member 20. Note that each side-face 20A of the vehicle frame member 20 is a portion including a side-plate portion 22B of the outer panel 22 and a side-plate portion 24B of the inner panel 24.

In the vehicle frame member 20, the opening-end 22D of the outer panel 22 and the opening-end 24D of the inner panel 24 are each positioned at the apex 26A of the bead 26. Namely, in the bead 26 divided with a boundary at the apex 26A, the bead-half 26B is formed at an opening-end 22D side of the outer panel 22, and the bead-half 26C is formed at an opening-end 24D side of the inner panel 24. Thus, in the vehicle frame member 20, neither the shape of the bead-half 26B nor the shape of the bead-half 26C is formed with an undercut, enabling the outer panel 22 and the inner panel 24 to be pressed more easily than, for example, in a structure in which the bead 26 is divided at an either side of a wall or a base of the bead 26. Further, it is possible to press the bead-half 26B of the outer panel 22 and the bead-half 26C of the inner panel 24 using a common mold.

Moreover, in the vehicle frame member 20, the apexes 26A of the beads 26 are positioned at the vehicle interior-exterior direction central position of the closed cross-section structure configured by the outer panel 22 and the inner panel 24, thereby improving the bending rigidity (maximum bending load) of the vehicle frame member 20 with respect to input (for example, collision load) from the vehicle outer side toward the inner side compared to a structure, for example, in which the apexes 26A of the beads 26 are positioned at a vehicle inner side of the central position. Namely, in the vehicle frame member 20, the rigidity at a vehicle interior-exterior direction central portion is improved by the beads 26, enabling out-of-plane deformation of the each side-face 20A with respect to input from the vehicle outer side toward the inner side to be reduced or prevented. Note that the "maximum bending load" here refers to the maximum bending load (bending load limit) which causes the vehicle frame member 20 to undergo plastic deformation.

Second Exemplary Embodiment

Explanation follows regarding a vehicle frame member according to a second exemplary embodiment of the present invention.

Vehicle Frame Member

Figure 2:
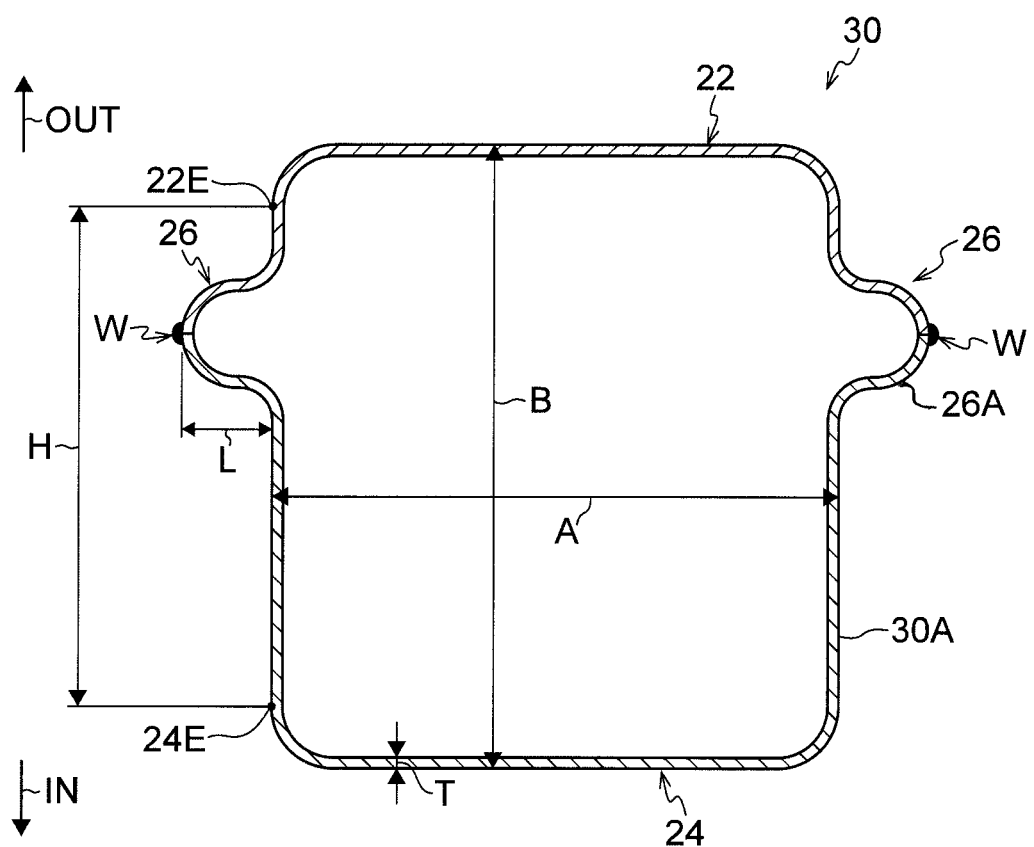
FIG. 2 is a cross-section of a vehicle frame member according to a second exemplary embodiment of the present disclosure.

As illustrated in FIG. 2, a vehicle frame member 30 of the second exemplary embodiment is configured similarly to the vehicle frame member 20 of the first exemplary embodiment except with regard to the position of the beads 26, and so explanation follows regarding the position of the beads 26. Note that in the vehicle frame member 30, configurations similar to those of the vehicle frame member 20 of the first exemplary embodiment are appended with the same reference signs, and explanation thereof is omitted.

In the vehicle frame member 30, the apexes 26A of the beads 26 are positioned to a vehicle outer side of the vehicle interior-exterior direction central position of the closed cross-section structure configured by the outer panel 22 and the inner panel 24.

Explanation follows regarding operation and advantageous effects of the vehicle frame member 30 of the present exemplary embodiment. Note that explanation is omitted regarding operation and advantageous effects obtained by configuration similar to the first exemplary embodiment.

In the vehicle frame member 30, the apexes 26A of the beads 26 are positioned at the vehicle outer side of the vehicle interior-exterior direction central position of the closed cross-section structure configured by the outer panel 22 and the inner panel 24, thereby improving the bending rigidity (maximum bending load) of the vehicle frame member 30 with respect to input (for example, collision load) from the vehicle outer side toward the inner side compared to the vehicle frame member 20 of the first exemplary embodiment. Namely, in the vehicle frame member 30, the rigidity of the portions positioned further to the vehicle outer side than the vehicle interior-exterior direction central positions is improved by the beads 26. This enables out-of-plane deformation of the portions positioned at the vehicle outer side at side faces 30A with respect to input from the vehicle outer side toward the inner side to be reduced or prevented. Thus, out-of-plane bending deformation of the side faces 30A of the vehicle frame member 30 is further reduced or prevented.

Other Exemplary Embodiments

In the first exemplary embodiment, configuration is made in which the beads 26 are formed at both of the abutting-joint portions W between the outer panel 22 and the inner panel 24; however, the present invention is not limited to this configuration. For example, configuration may be made in which a bead 26 is formed at one abutting-joint portion W between the outer panel 22 and the inner panel 24, without a bead 26 being formed at the other abutting-joint portion W. This configuration, too, enables bending rigidity to be secured compared to, for example, a structure in which beads 26 are not formed at either of the abutting-joint portions W between an outer panel and an inner panel. Note that the configuration above may be applied to the second exemplary embodiment also.

Further, in the first exemplary embodiment, each opening-end 22D of the outer panel 22 and each opening-end 24D of the inner panel 24 respectively abut together and are joined; however, the present invention is not limited to this configuration. For example, configuration may be made in which one of the opening-ends 22D of the outer panel 22 and one of the opening-ends 24D of the inner panel 24 abut together and are joined; and the other opening-end 22D of the outer panel 22 is bent back to form a flange, the other opening-end 24D of the inner panel 24 is bent back to form a flange, and these flanges are joined together by spot welding. Note that the configuration above may be applied to the second exemplary embodiment also.

Moreover, in the first exemplary embodiment, the apexes 26A of the beads 26 are curved in circular arc shapes at the closed cross-section structure configured by the outer panel 22 and the inner panel 24. However, the present invention is not limited to this configuration. For example, the apex 26A of the beads 26 may be flattened portions at the closed cross-section structure. Note that the configuration above may be applied to the second exemplary embodiment also.

Moreover, in the first exemplary embodiment, each bead 26 at the closed cross-section structure configured by the outer panel 22 and the inner panel 24 has a shape forming a continuous curve from the base thereof to the apex 26A. However, the present invention is not limited to this configuration. For example, in the closed cross-section structure, a portion (wall) from the base to the apex 26A of the bead 26 may be configured with a shape extending along the projection direction of the bead 26.

Explanation has been given regarding exemplary embodiments of the present invention; however, the present invention is not limited to the above, and obviously various other modifications may also be implemented within a range not departing from the spirit of the invention.

Testing

To confirm the advantageous effects of the present disclosure, vehicle frame members of Examples according to the present disclosure and vehicle frame members of Comparative Examples were prepared, and the following tests were performed.

Explanation is first given regarding respective vehicle frame members of an Example 1, an Example 2, a Comparative Example 1, and a Comparative Example 2 used in testing, followed by explanation regarding test conditions.

Example 1

The vehicle frame member of Example 1 has the same structure as the vehicle frame member 20 of the first exemplary embodiment (see FIG. 1). Accordingly, explanation of the vehicle frame member of Example 1 draws on the example of the vehicle frame member 20 of the first exemplary embodiment. The vehicle frame member of Example 1 is configured with cross-section size A (widthwise in the drawing)×B (heightwise in the drawing) of 65 mm×70 mm, and is configured with a plate thickness T of 1.0 mm. Further, the vehicle frame member of Example 1 is configured by a double layer of 1180 MPa grade sheet steel. Moreover, the apexes 26A (peak points) of the beads 26 are positioned at the vehicle interior-exterior direction central position. In other words, when the length of each side-face 20A of the vehicle frame member 20 is H, the apex 26A of each bead 26 is positioned at a position 0.5 H. Further, a projection height L of each bead 26 is 10 mm. Note that the length H of each side-face 20A is a length along the side-face 20A, from an end 22E of the curved portion 22C of the outer panel 22 to an end 24E of the curved portion 24C of the inner panel 24. Similarly the projection height L of the bead 26 is a length (height) along a bead projection direction, from the side-face 20A to the apex 26A of the bead 26.

Example 2

The vehicle frame member of Example 2 has the same structure as the vehicle frame member 30 of the second exemplary embodiment (see FIG. 2). Accordingly, explanation of the vehicle frame member of Example 2 draws on the example of the vehicle frame member 30 of the second exemplary embodiment. Note that the vehicle frame member of Example 2 has the same structure as Example 1, except in that the apexes 26A (peak points) of the beads 26 are positioned at a position 0.25H from the ends 22E of the curve outer-faces of the curved portions 22C of the outer panel 22.

Comparative Example 1

Figure 3:
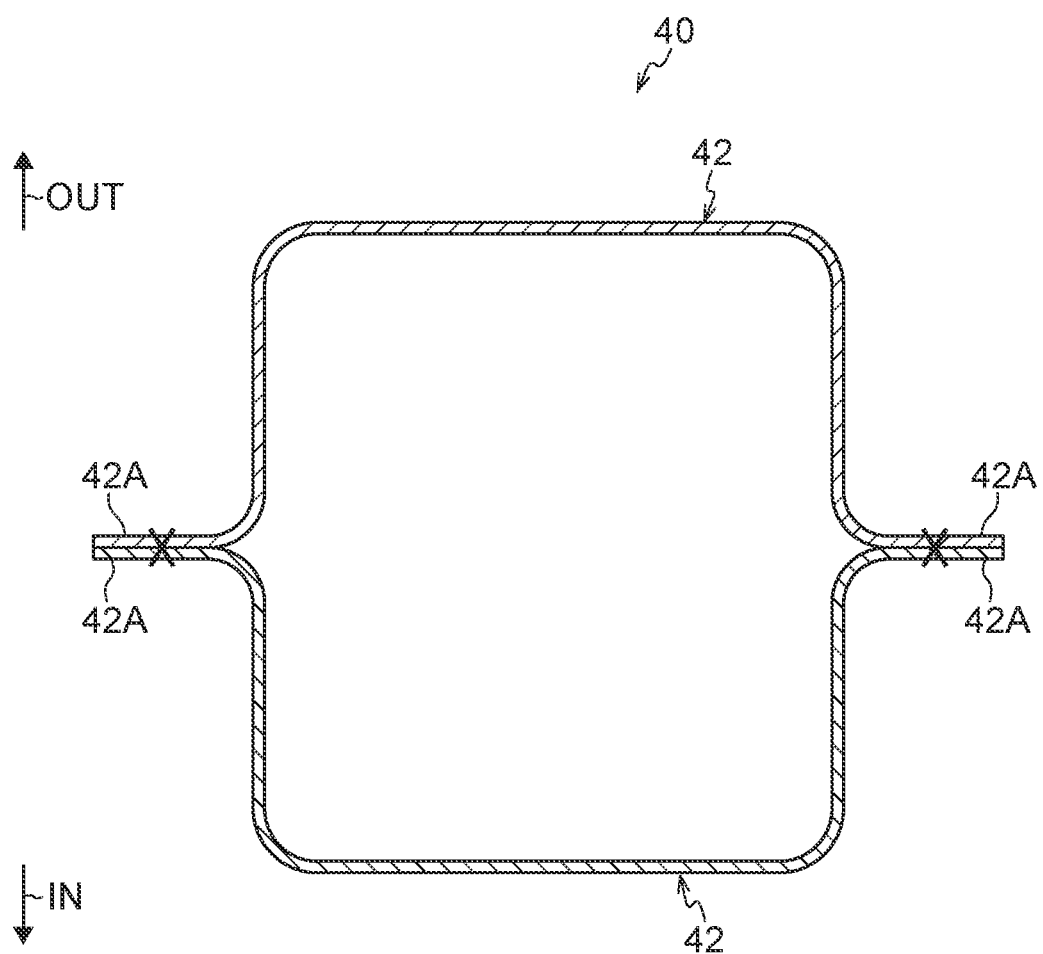
FIG. 3 is a cross-section of a vehicle frame member of Comparative Example 1.

A vehicle frame member 40 of Comparative Example 1 is a vehicle frame member in which flanges 42A of two panels 42 each configured with a hat-shaped cross-section are spot welded together (see FIG. 3). Note that the cross-section size and plate thickness of the vehicle frame member of Comparative Example 1 are the same as those of the vehicle frame member of Example 1.

Comparative Example 2

Figure 4:
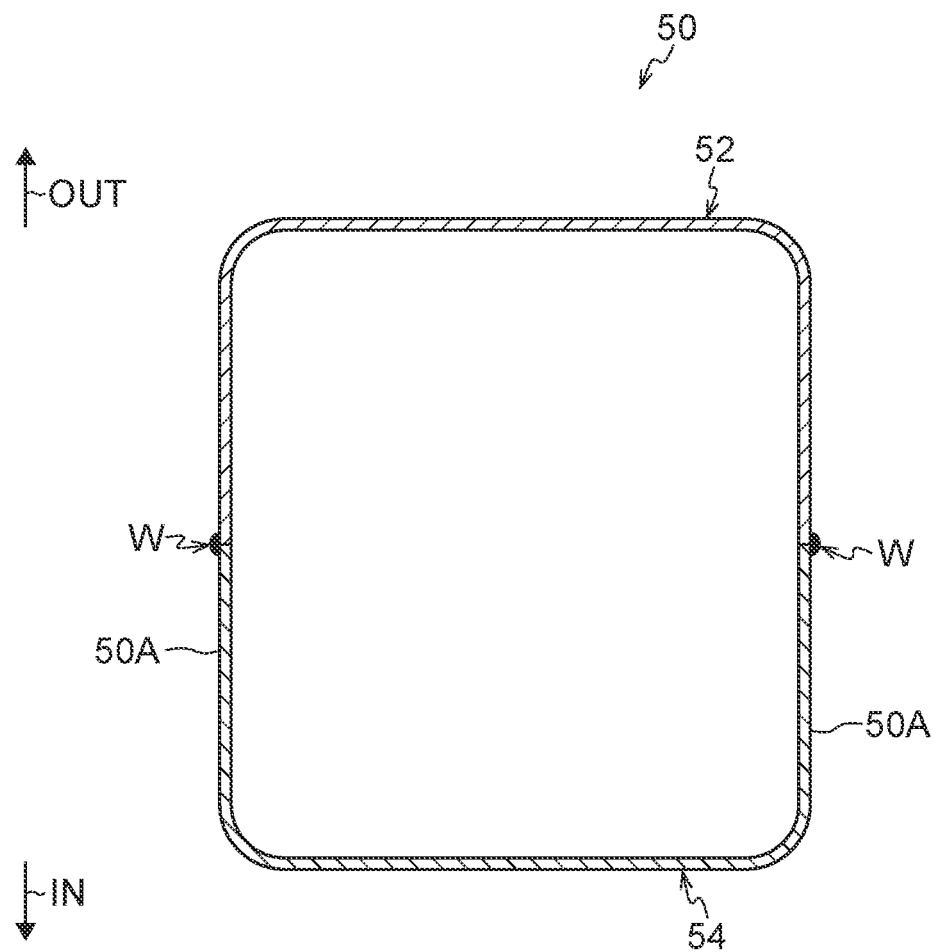
FIG. 4 is a cross-section of a vehicle frame member of Comparative Example 2.

A vehicle frame member 50 of Comparative Example 2 is a vehicle frame member with a structure in which beads are not formed at portions where an outer panel 52 and an inner panel 54 abut together and are joined (see FIG. 4). Note that the cross-section size and plate thickness of the vehicle frame member of Comparative Example 2 are the same as those of the vehicle frame member of Example 1.

Test Conditions

In testing, a four point static bending test was performed on the vehicle frame member of each Example and each Comparative Example. As illustrated in FIG. 5, in the four point static bending test, the inner panel of the respective vehicle frame members was supported by support members 60, and the inter-support distance X therebetween was set to 800 mm. Note that the surface of each support member 60 supporting the inner panel of the respective vehicle frame member was configured by a circular arc shape having a 25 mm radius. Further, the surfaces of point-load members 62 pressing the outer panel of each vehicle frame member were each configured by a circular arc shape having a 25 mm radius.

In the four point static bending test, the maximum bending load of the vehicle frame members of each Example and each Comparative Example was measured, and the mass efficiency was computed from the measured result and illustrated in the bar graph in FIG. 6.

As illustrated in FIG. 6, it is apparent that mass efficiency in Example 1 and Example 2 applied with the present disclosure was better than in Comparative Example 1 and Comparative Example 2. Further, is it apparent that since mass efficiency was better in Example 2 than in Example 1, positioning the beads at 0.25H makes a greater contribution to improving maximum bending load than positioning the beads at 0.5H.

Figure 7A:
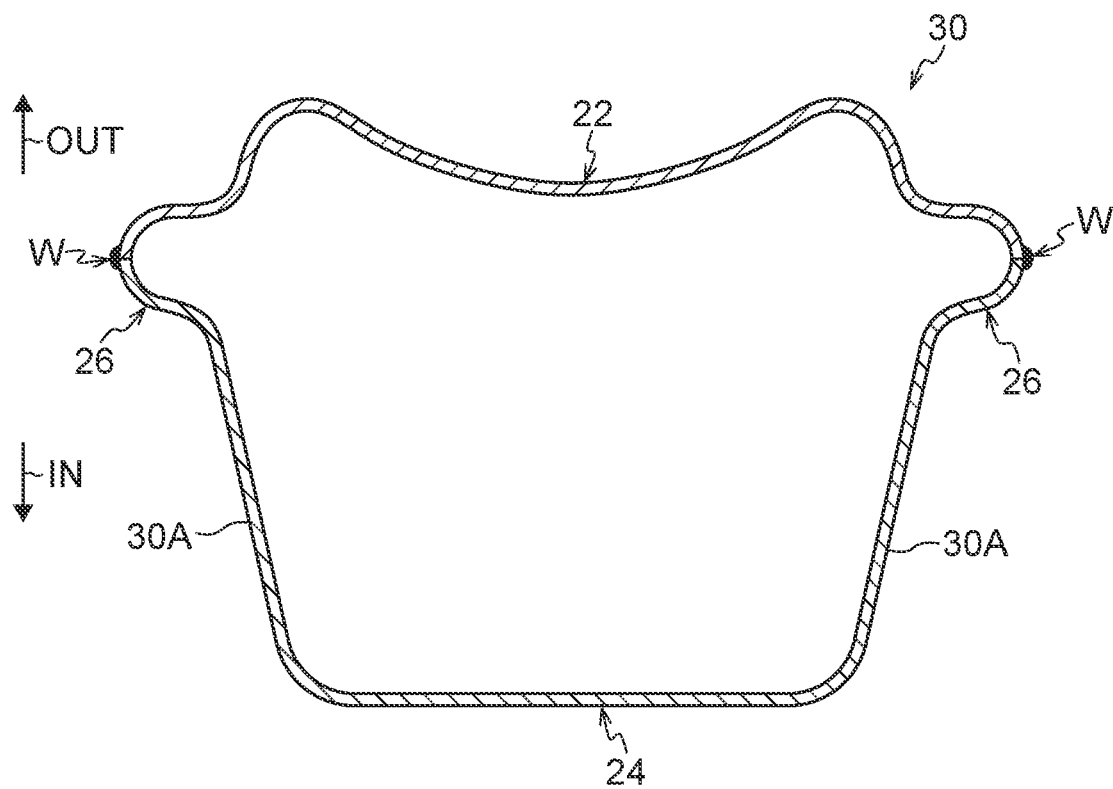
FIG. 7A is a cross-section illustrating a vehicle frame member of Example 2 in a deformed state.
Figure 7B:
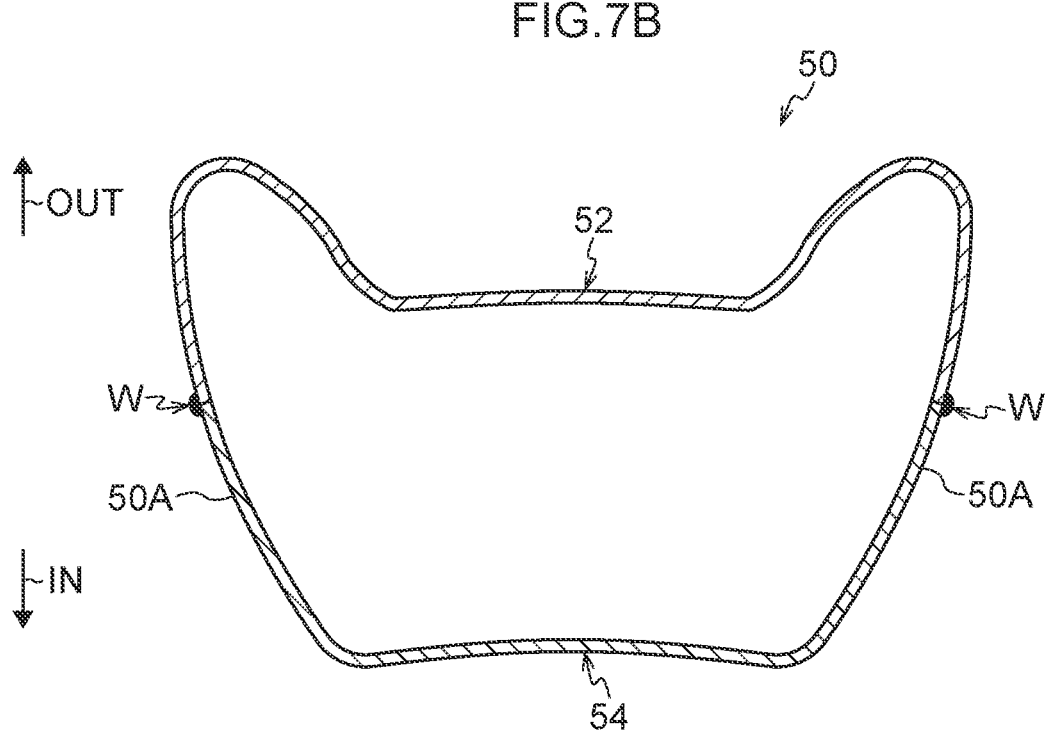
FIG. 7B is a cross-section illustrating a vehicle frame member of Comparative Example 2 in a deformed state.

Note that FIG. 7A and FIG. 7B respectively illustrate vehicle frame members of Example 2 and Comparative Example 2 in a state deformed under the same load. As is apparent from FIG. 7A and FIG. 7B, out-of-plane deformation of the side faces 30A of the vehicle frame member 30 of Example 2 was better reduced than out-of-plane deformation of side faces 50A of the vehicle frame member 50 of Comparative Example 2. This is surmised to be because providing beads to side faces of a vehicle frame member improves the rigidity of the side faces in an out-of-plane deformation direction.

What is claimed is:

1. A vehicle frame member comprising:
    an outer panel configured to be disposed at a vehicle outer side, and having a U-shaped cross-section open toward a vehicle inner side;
    an inner panel configured to be disposed at the vehicle inner side, having a U-shaped cross-section open toward the vehicle outer side, and configuring a closed cross section structure together with the outer panel by both opening-ends of the inner panel respectively abutting and being joined to both opening-ends of the outer panel; and
    a bead formed at one or both abutting-joint portions between the outer panel and the inner panel, and projecting toward an outside of the closed cross section structure.

2. The vehicle frame member of claim 1, wherein at least one of the opening-ends of the outer panel and at least one of the opening-ends of the inner panel are respectively positioned at an apex of the bead.

3. The vehicle frame member of claim 1, wherein the apex of the bead is positioned at a central position at the closed cross section structure in a vehicle interior-exterior direction, or further to a vehicle outer side than the central position.

4. The vehicle frame member of claim 2, wherein the apex of the bead is positioned at a central position at the closed cross section structure in a vehicle interior-exterior direction, or further to a vehicle outer side than the central position.

5. The vehicle frame member of claim 1, wherein the bead is formed by a bead-half that is one piece of the outer panel and by a bead-half that is one piece of the inner panel.

6. The vehicle frame member of claim 2, wherein the bead is formed by a bead-half that is one piece of the outer panel and by a bead-half that is one piece of the inner panel.

7. The vehicle frame member of claim 3, wherein the bead is formed by a bead-half that is one piece of the outer panel and by a bead-half that is one piece of the inner panel.

8. The vehicle frame member of claim 4, wherein the bead is formed by a bead-half that is one piece of the outer panel and by a bead-half that is one piece of the inner panel.

* * * * *